US007661095B2

(12) United States Patent
George

(10) Patent No.: US 7,661,095 B2
(45) Date of Patent: Feb. 9, 2010

(54) SYSTEM AND METHOD TO BUILD A CALLGRAPH FOR FUNCTIONS WITH MULTIPLE ENTRY POINTS

(75) Inventor: Jini Susan George, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1040 days.

(21) Appl. No.: 11/109,019

(22) Filed: Apr. 14, 2005

(65) Prior Publication Data
US 2006/0236309 A1 Oct. 19, 2006

(51) Int. Cl.
*G06F 9/44* (2006.01)
(52) U.S. Cl. .................. 717/133; 717/130; 717/131
(58) Field of Classification Search ......... 717/130–133, 717/154, 157–158
See application file for complete search history.

(56) References Cited

U.S. PATENT DOCUMENTS

| 5,768,595 | A * | 6/1998 | Gillies ..................... 717/145 |
| 7,003,507 | B2 * | 2/2006 | Tip et al. ..................... 707/2 |
| 7,240,335 | B2 * | 7/2007 | Angel et al. ............... 717/130 |
| 7,281,242 | B2 * | 10/2007 | Inamdar .................... 717/158 |
| 7,493,630 | B2 * | 2/2009 | Hunt ......................... 719/330 |
| 2002/0049963 | A1 * | 4/2002 | Beck et al. ................. 717/130 |
| 2002/0112227 | A1 * | 8/2002 | Kramskoy et al. .......... 717/148 |
| 2002/0152455 | A1 * | 10/2002 | Hundt et al. ................ 717/131 |
| 2003/0041316 | A1 * | 2/2003 | Hibbeler et al. ............ 717/130 |
| 2003/0066055 | A1 * | 4/2003 | Spivey ....................... 717/131 |
| 2004/0003375 | A1 * | 1/2004 | George et al. .............. 717/124 |
| 2005/0097533 | A1 * | 5/2005 | Chakrabarti et al. ........ 717/144 |
| 2006/0225056 | A1 * | 10/2006 | Mukkavilli ................ 717/141 |

OTHER PUBLICATIONS

Orso et al. "An Empirical Comparison of Dynamic Impact Analysis Algorithms", May 2004, IEEE Computer society, 10 pages.*
Truong et al. "On using SCALEA for performance analysis of distributed and parallel programs", Nov. 2001, ACM, pp. 1-14.*
Dor et al. "Software Validation via Scalable Path-Sensitive Value Flow Analysis", Jul. 2004, ACM, pp. 12-22.*

* cited by examiner

*Primary Examiner*—Anna Deng

(57) ABSTRACT

A technique for building a callgraph for a software program that includes multiple function entry points using dynamic instrumentation. In one example embodiment, this is achieved by inserting function count probe code at each function entry point of each multiple entry function having multiple function entry points in the software program. Inter-entry point arc probe code is then inserted substantially before each arc source address of an arc. A performance analysis tool is then used to collect data resulting from execution of the software program including the function count probe code and the inter-entry point arc probe code and to obtain an actual function count value for each multiple entry function. A callgraph is then built using the obtained actual function count values.

14 Claims, 2 Drawing Sheets

SYSTEM AND METHOD TO BUILD A CALLGRAPH FOR FUNCTIONS WITH MULTIPLE ENTRY POINTS

TECHNICAL FIELD OF THE INVENTION

The present invention relates generally to analysis of computer programs, and more particularly relates to a callgraph used in run-time analysis of applications and library functions.

BACKGROUND OF THE INVENTION

Code instrumentation is a method for analyzing and evaluating program code performance. In one approach to code instrumentation, new instructions (or probe code) are added to the program, and, consequently, the original code in the program is changed and/or relocated. Some examples of probe code include adding values to a register, moving the content of one register to another register, moving the address of some data to some registers, etc. The changed and/or relocated code is referred to as instrumented code or, more generally, as an instrumented process. For purposes of the present discussion, instrumented code is one type of dynamically generated code. Although the following discussion explicitly recites and discusses code instrumentation, such discussion and examples are for illustration only. That is, the following discussion also applies to various other types of dynamically generated code.

One specific type of code instrumentation is referred to as dynamic binary instrumentation. Dynamic binary instrumentation allows program instructions to be changed on-the-fly. Measurements such as basic-block coverage and function invocation counting can be accurately determined using dynamic binary instrumentation. In some instances, dynamic binary instrumentation, as opposed to static instrumentation, is performed at program run-time and only instruments those parts of an executable that are actually executed. This minimizes the overhead imposed by the instrumentation process itself. Furthermore, performance analysis tools based on dynamic binary instrumentation require no special preparation of an executable such as, for example, a modified build or link process.

A typical prior art code instrumentation process implements dynamic binary instrumentation and analysis by compiling the source code of a target application (e.g., the application being analyzed) with a specific instrumentation option enabled. This option results in the application code being compiled and instrumented with probe code to facilitate analysis. The probe code is a sequence of instructions used to collect different metrics of the profiled application code. When the resulting instrumented application code is executed, profile data generated by the inserted probe code is collected in a file for later analysis. This instrumentation process does not require any prior modification to the application code. The profile data is then examined and used to create reports depicting the execution flow of the application code.

Current dynamic profiling tools combine dynamic binary instrumentation and periodic sampling to produce a callgraph for application code which has not been compiled/linked with any special options. The callgraph consists of entries for associated functions sorted according to the total time of their descendants and themselves. Every entry in the callgraph is accompanied by data that shows the number of times a function was called by its associated parent(s) and the number of times the function called its associated children.

Generally, to compile such data in the callgraph during the code execution the instrumentation process collects information such as sample counts, arc counts, and function counts. The sample counts include collecting instruction pointer samples, which are also referred to as a program counter samples, at regular intervals during the code execution of a profiled application. These instruction pointer samples are then processed to obtain an estimate of the amount of time taken at different functions during the code execution.

The arc count consists of a source address, a target address and a count representing the number of times this arc was executed. Only those arcs for which the target addresses form function entry points are considered to collect arc count values. The collected arc count values are then processed to determine the parents (callers) and children (callees) for every function in the profiled application code.

The function count consists of a function start address and a count value. The count value represents the number of times the function was executed in the profiled application code. In the current instrumentation process the callgraph is generated using static instrumentation and the function count for a function is not collected using the probe code, but is calculated by adding up the counts of all the call arcs for which this function formed the target. This type of callgraph generation according to the current instrumentation process is error prone since if for any reason the source function cannot not be instrumented, then there would not be any arcs from the source function to a target function. This can result in excluding the number of arcs from that source function in the total function count of the target function. This can in-turn result in an incorrect callgraph.

In addition, calculation of function counts of functions with multiple entry points, which can start executing from more than one single address, requires every entry point to be treated as a separate function and that the probe code be placed at every function entry point during the instrumentation process. Generally, for callgraph generation, since different function entry points are considered as separate functions and only the call arcs are collected, the point non-call arcs which contribute to the time propagated from one function entry point to another can get missed out and result in an incorrect callgraph.

SUMMARY OF THE INVENTION

According to an aspect of the invention, there is provided a method for building a callgraph for a software program including functions with multiple entry points using a dynamic profiler, the method including the steps of inserting function count probe code at each function entry point of each multiple entry function in the software program, wherein the multiple entry function has multiple function entry points, inserting inter-entry point arc probe code substantially before each arc source address of an arc, and collecting data resulting from execution of the software program including the function count probe code and the inter-entry point arc probe code, wherein the collected data includes a function count value and an inter-entry point arc count value for each arc source address obtained from execution of the software program.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "determining", "instrumenting", and "executing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to use of other computer systems such as, for example, optical and mechanical computers.

Figure 1:
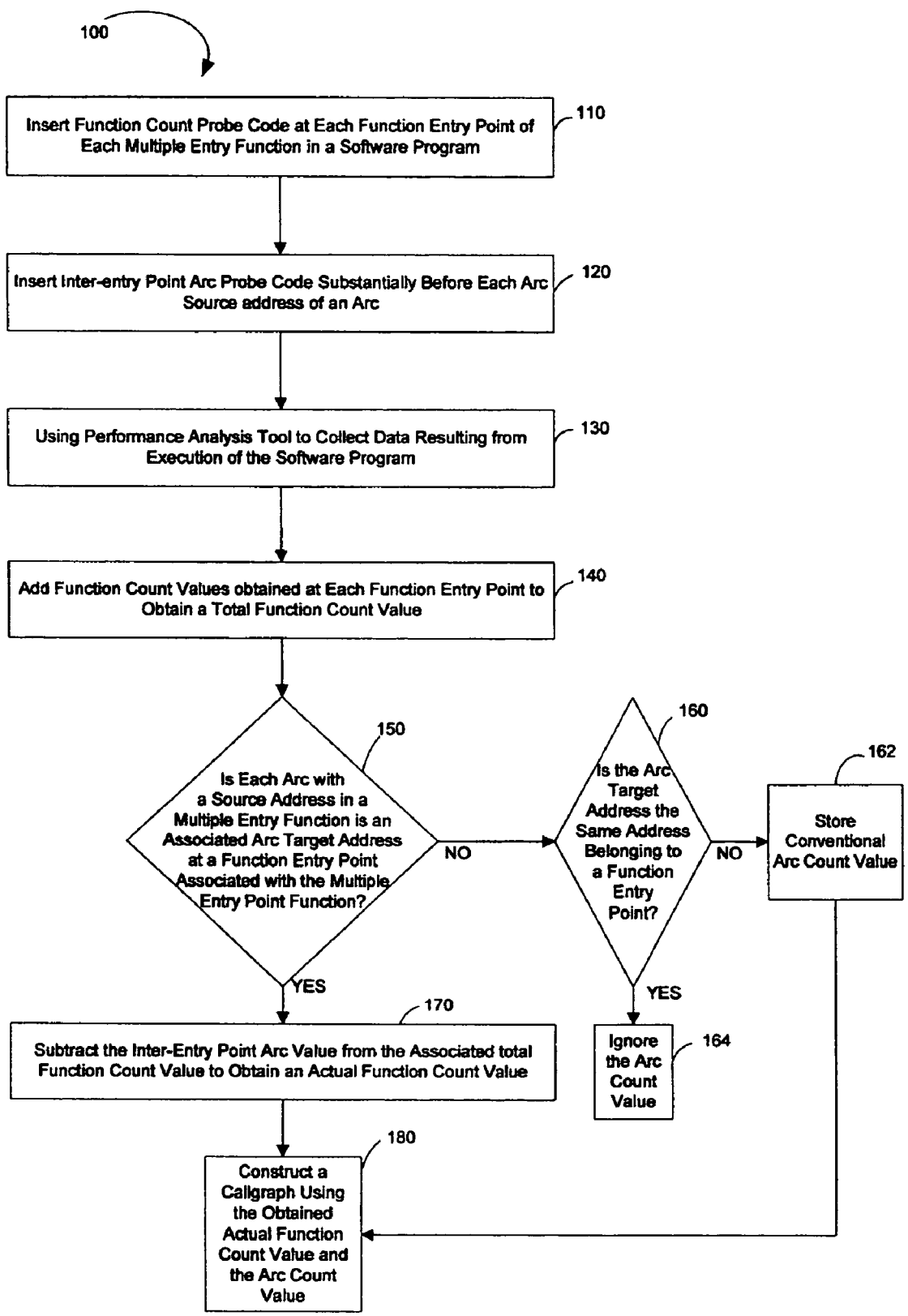
FIG. 1 is a flowchart illustrating an example method for building a callgraph according to an embodiment of the present invention.

FIG. 1 illustrates an example method 100 for building a callgraph using a dynamic profiler. At step 110, this example method 100 begins by inserting function count probe code at each function entry point of each multiple entry function in a software program. Function count probe code can be considered to be a sequence of instructions to collect different metrics of the target application (for example, the program being examined). The function count probe code is inserted into the software program to collect function count values at each function entry point. In some embodiments, the present invention inserts the function count probe code dynamically in order to limit the resulting instrumentation only to the part of the code executed. This aspect also eliminates the need for any special compilation flag to enable profiling of a target application, thereby eliminating a need to recompile the target application in order to accomplish the profiling. This aspect also results in the shared libraries also getting automatically profiled.

At step 120, inter-entry point arc probe code is inserted substantially before each arc source address of an arc. Inter-entry point arc probe code can be considered to be a sequence of instructions to collect different metrics of the target application. The inter-entry point arc probe code is inserted in the software program to collect inter-entry point arc count value for each branch and not just for call arcs. That is, to collect the inter-entry point arc count value for each arc source address obtained from execution of the software program. This is because some of the inter-entry point arc count values can contribute to the total associated function count value.

At step 130, a means such as a performance analysis tool is used to collect data resulting from execution of the software program including the function count probe code and the inter-entry point arc probe code. The collected data includes a function count value for each entry point and an inter-entry point arc count value for each arc source address obtained from execution of the software program. The function count probe code and the inter entry point arc probe code inserted into instrumented functions increments the function count values and the inter-entry point arc count values each time the functions get called. In some embodiments, the collected function count values and associated inter-entry point arc count values are stored in memory. In some embodiments, the inter-entry point arc count value consists of a source address, a target address, and a count representing the number of times this inter-entry point arc count was executed. Those arcs for which the target addresses form function entry points are considered. These types of arcs, for example, are referred to as call arcs. In some embodiments, the hardware registers of a computer system executing the software program are read to collect the data regarding the hardware registers when one of the multiple function entry points is encountered during the execution of the software program.

At step 140, function count values obtained at each function entry point are added to obtain a total function count value. At step 150, the method 100 determines whether each arc with a source address in the multiple entry function is an arc target address at a function entry point associated with the multiple entry function. In these embodiments, each of the inter-entry point arc count values is checked with the source address belonging to each function associated with the multiple function entry points. Also, in these embodiments, a determination is made as to whether the arc target address of the inter-entry point arc count value is associated with the same function and if the target address is the address of an entry point in a multiple function entry point then it is concluded to be the inter-entry point arc count value which adds up to the total function count value for the associated multiple entry function.

Based on the determination at step 150, if each arc with a source address in the multiple entry function is not a target address at a function entry point associated with the multiple entry function then the method 100 goes to step 160. At 160 the method 100 determines whether the arc target address is the same address belonging to a function entry point associated with a multiple entry function.

Based on the determination at step 160, if the arc target address is not the same address associated with the function entry point then the method 100 goes to step 162, and stores and collects data as a conventional arc count value for a typical callgraph generation. In these embodiments, arc count probe code is inserted substantially before the inter-entry point arc probe code. The performance analysis tool is then used to collect data resulting from execution of the arc count probe code. An arc count value associated with each inter-entry point arc probe code is then generated using the collected data.

Based on the determination at step 160, if the arc target address is the same address associated with the function entry point then the method 100 goes to step 164 and ignores the arc count value and is not used in construction the callgraph.

Based on the determination at step 150, if the arc target address associated with the arc source address is at the function entry point associated with the multiple entry function then the method 100 goes to step 170 and subtracts the inter-entry point arc value from the associated total count value to obtain an actual function count value.

At step 180, the present invention constructs a callgraph using the actual function count value associated with each multiple entry function obtained using the above described steps 110-170.

Although the flowchart 100 includes steps 110-180 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

In one embodiment, the present invention inserts probe code into a program during runtime. The present embodiment uses a performance analysis tool to collect data resulting from execution of the probe code. The data resulting from the execution includes instruction pointer samples from execution of the program. Specifically, according to this embodiment the data is used to generate a report based on a combination of dynamic instrumentation. It is noted that embodiments of the present invention described here in are not restricted to any particular architecture. However, example implementations are described in the context of a UNIX operating environment (e.g., HP-UX) running on a 64 bit microprocessor computer systems (e.g., running on Itanium™ processors).

Various embodiments of the present subject matter can be implemented in software, which may be run in the environment shown in FIG. 2 (to be described below) or in any other suitable computing environment. The embodiments of the present subject matter are operable in a number of general-purpose or special-purpose computing environments. For example, these may include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. Furthermore, embodiments of the present invention may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 2:
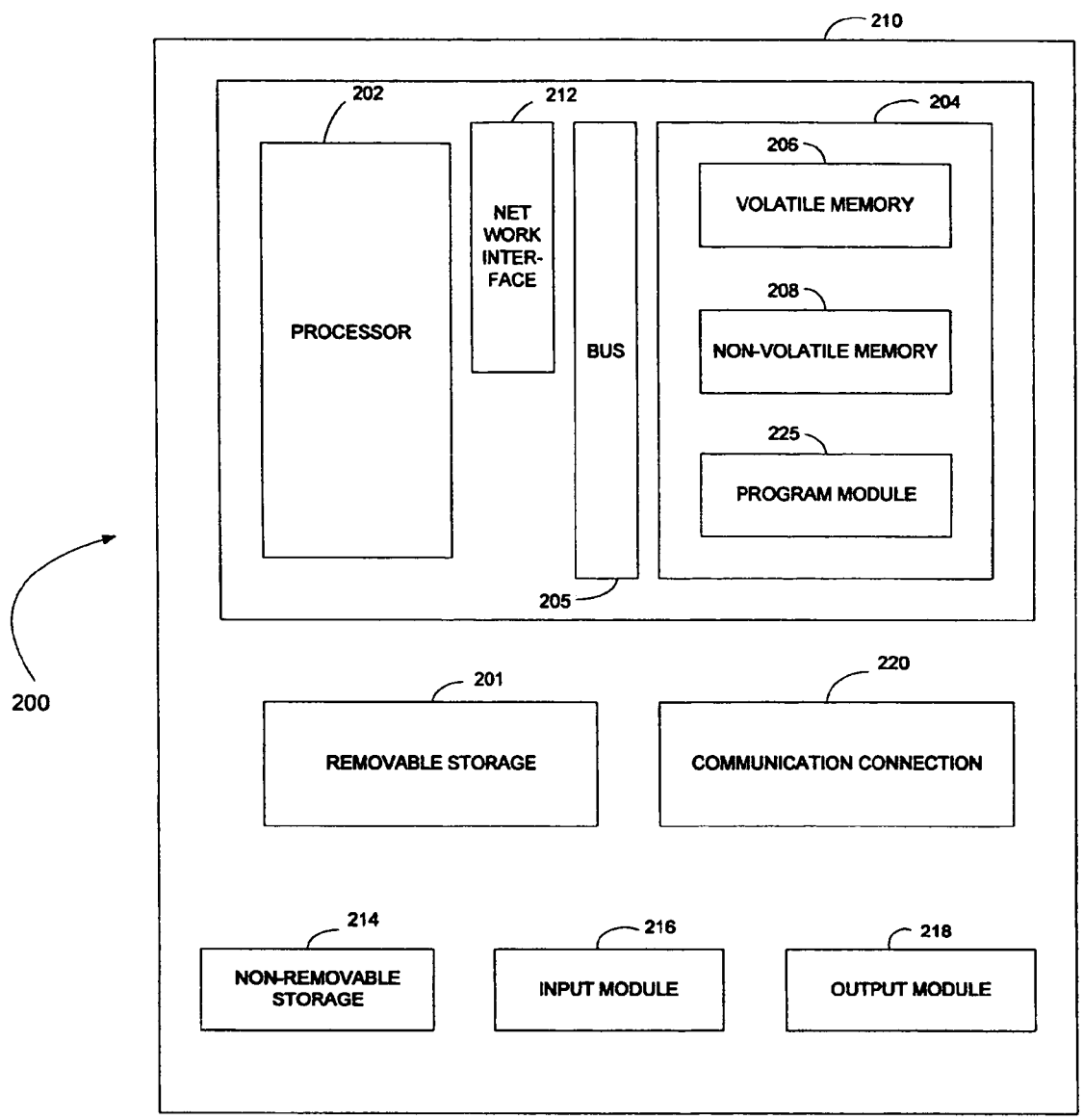
FIG. 2 is a block diagram of a typical computer system used for implementing embodiments shown in FIG. 1.

FIG. 2 shows an example of a suitable computing system environment for implementing embodiments of the present subject matter. FIG. 2 and the following discussion are intended to provide a brief, general description of a suitable computing environment in which certain embodiments of the inventive concepts contained herein may be implemented.

A general computing device, in the form of a computer 210, may include a processor 202, memory 204, removable storage 201, and non -removable storage 214. Computer 210 additionally includes a bus 205 and a network interface (NI) 212.

Computer 210 may include or have access to a computing environment that includes one or more user input modules 216, one or more output modules 218, and one or more communication connections 220 such as a network interface card or a USB connection. The one or more output devices 218 can be a display device of computer, computer monitor, TV screen, plasma display, LCD display, display on a digitizer, display on an electronic tablet, and the like. The computer 210 may operate in a networked environment using the communication connection 220 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 204 may include volatile memory 206 and non-volatile memory 208. A variety of computer-readable media may be stored in and accessed from the memory elements of computer 210, such as volatile memory 206 and non-volatile memory 208, removable storage 201 and non-removable storage 214. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 202 of the computer 210. For example, a program module 225 may include machine-readable instructions capable of building a callgraph for a software program including one or more multiple entry functions according to the teachings and herein described embodiments of the present subject matter. In one embodiment, the program module 225 may be included on a CD-ROM and loaded from the CD-ROM to a hard drive in non-volatile memory 208. The machine-readable instructions cause the computer 210 to encode according to the various embodiments of the present subject matter. As shown, the program module 225 includes instructions to build a callgraph according to various embodiments of the present invention.

The operation of the computer system 200 for building the callgraph is explained in more detail with reference to FIG. 1.

This process al so allows collecting and building a more accurate callgraph for a software program including functions with one or more multiple entry points when using a dynamic profiler. The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive, and other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art and the elements, algorithms, and sequence of operations can all be varied to suit particular requirements or contexts. The operations described-above with respect to the method illustrated in FIG. 1 can be performed in a different order from those shown and described herein.

FIGS. 1-2 are merely representational and are not drawn to scale. Certain proportions thereof may be exaggerated, while others may be minimized. FIGS. 1-2 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method of building a callgraph for multiple entry functions in a software program using dynamic instrumentation comprising:

inserting function count probe code at each function entry point of each multiple entry function in the software program, wherein the multiple entry function has multiple function entry points;

inserting inter-entry point arc probe code substantially before each arc source address of an arc in the software program;

collecting data resulting from execution of the software program including the function count probe code and the inter-entry point arc probe code, wherein the collected data includes a function count value and an inter-entry point arc count value for each arc source address obtained from execution of the software program;

adding function count values obtained at each function entry point to obtain a total function count value;

determining whether each arc with a source address in a multiple entry function is associated with an arc target address at one of the function entry points of an associated multiple entry function, wherein at least one of the function entry points is associated with the total function count value;

if yes, subtracting the inter-entry point arc count value from the associated total function count value to obtain an actual function count value for the associated multiple entry function; and constructing a callgraph using the actual function count value associated with each multiple entry function.

2. The method of claim 1, further comprising:

inserting arc count probe code substantially before the inter-entry point arc probe code;

collecting data resulting from execution of the arc count probe code;

generating an arc count value associated with each inter-entry point arc probe code using the collected data.

3. The method of claim 1, further comprising:

inserting the inter-entry point arc probe code and the function count probe code dynamically such that instrumentation is inserted into an executing portion of the software program.

4. The method of claim 1, further comprising:

dynamically instrumenting at least one multiple entry function in the software program when one of the multiple function entry points is encountered during the execution of the software program.

5. The method of claim 1, further comprising:

reading hardware registers of a computer system executing the software program to collect the data regarding the hardware registers when one of the multiple function entry points is encountered during execution of the software program.

6. A method comprising:

inserting function count probe code at each function entry point of each multiple entry function in a software program during runtime, wherein the multiple entry function has multiple function entry points;

inserting inter-entry point arc probe code substantially adjacent and before each arc source address of an arc in the software program during the runtime;

collecting data resulting from execution of the software program including the function count probe code and the inter-entry point arc probe code, wherein the collected data includes a function count value and an inter-entry point arc count value for each arc source address obtained from execution of the software program;

adding function count values obtained at each function entry point to obtain a total function count value;

determining whether each arc with a source address in a multiple entry function is associated with an arc target address at one of the function entry points of an associated multiple entry function, wherein at least one of the function entry points is associated with the total function count value;

if yes, subtracting the inter-entry point arc count value from the associated total function count value to obtain an actual function count value for the associated multiple entry function; and constructing a callgraph using the actual function count value associated with each multiple entry function.

7. The method of claim 6, further comprising:

inserting arc count probe code substantially before the inter-entry point arc probe code; and collecting data resulting from execution of the arc count probe code; and generating an arc count value associated with each inter-entry point arc probe code using the collected data.

8. An article comprising:

a storage medium having instructions that, when executed by a computing platform, result in execution of a method comprising:

inserting function count probe code at each function entry point of each multiple entry function in the software program, wherein the multiple entry function has multiple function entry points;

inserting inter-entry point arc probe code substantially before each arc source address of an arc in the software program;

collecting data resulting from execution of the software program including the function count probe code and the inter-entry point arc probe code, wherein the collected data includes a function count value and an inter-entry point arc count value for each arc source address obtained from execution of the software program;

adding function count values obtained at each function entry point to obtain a total function count value;

determining whether each arc with a source address in a multiple entry function is associated with an arc target address at one of the function entry points of an associated multiple entry function, wherein at least one of the function entry points is associated with the total function count value;

if yes, subtracting the inter-entry point arc count value from the associated total function count value to obtain an actual function count value for the associated multiple entry function; and constructing a callgraph using the actual function count value associated with each multiple entry function.

9. The article of claim 8, further comprising:

inserting arc count probe code substantially before the inter-entry point arc probe code; and collecting data resulting from execution of the arc count probe code; and generating an arc count value associated with each inter-entry point arc probe code using the collected data.

10. The article of claim 8, further comprising:

inserting the inter-entry point arc probe code and the function count probe code dynamically such that instrumentation is inserted into an executing portion of the software program.

11. A computer system comprising:

a network interface;

an input module coupled to the network interface that receives the input data via the network interface;

a processor; and a memory coupled to the processor, the memory having stored therein code which when decoded by the processor, the code causes the processor to perform a method comprising:

inserting function count probe code at each function entry point of each multiple entry function in the software program, wherein the multiple entry function has multiple function entry points;

inserting inter-entry point arc probe code substantially before each arc source address of an arc in the software program;

collecting data resulting from execution of the software program including the function count probe code and the inter-entry point arc probe code, wherein the collected data includes a function count value and an inter-entry point arc count value for each arc source address obtained from execution of the software program;

adding function count values obtained at each function entry point to obtain a total function count value;

determining whether each arc with a source address in a multiple entry function is associated with an arc target address at one of the function entry points of an associated multiple entry function, wherein at least one of the function entry points is associated with the total function count value;

if yes, subtracting the inter-entry point arc count value from the associated total function count value to obtain an actual function count value for the associated multiple entry function; and constructing a callgraph using the actual function count value associated with each multiple entry function.

12. The system of claim 11 further comprising:

inserting arc count probe code substantially before the inter-entry point arc probe code; and collecting data resulting from execution of the arc count probe code; and generating an arc count value associated with each inter-entry point arc probe code using the collected data.

13. The system of claim 11, further comprising:

inserting the inter-entry point arc probe code and the function count probe code dynamically such that instrumentation is inserted into an executing portion of the software program.

14. The system as claimed in any preceding claim wherein the data is collected using a performance analysis tool.

* * * * *

UNITED STATES PATENT AND TRADEMARK OFFICE
CERTIFICATE OF CORRECTION

| | | |
|---|---|---|
| PATENT NO. | : 7,661,095 B2 | |
| APPLICATION NO. | : 11/109019 | |
| DATED | : February 9, 2010 | |
| INVENTOR(S) | : Jini Susan George | |

It is certified that error appears in the above-identified patent and that said Letters Patent is hereby corrected as shown below:

In column 2, line 39, delete "point" and insert -- inter-entry point --, therefor.

In column 7, line 65, in Claim 2, after "code;" insert -- and --.

Signed and Sealed this

Eleventh Day of May, 2010

David J. Kappos
*Director of the United States Patent and Trademark Office*